US010295388B2

(12) United States Patent
Erkelenz et al.

(10) Patent No.: US 10,295,388 B2
(45) Date of Patent: May 21, 2019

(54) METHOD FOR OPERATING A CORIOLIS MASS FLOWMETER AND RESPECTIVE CORIOLIS MASS FLOWMETER

(71) Applicant: KROHNE Messtechnik GmbH, Duisburg (DE)

(72) Inventors: Alexander Erkelenz, Moers (DE); Ralf Storm, Essen (DE)

(73) Assignee: KROHNE Messtechnik GmbH, Duisburg (DE)

( * ) Notice: Subject to any disclaimer, the term of this patent is extended or adjusted under 35 U.S.C. 154(b) by 274 days.

(21) Appl. No.: 15/210,216

(22) Filed: Jul. 14, 2016

(65) Prior Publication Data

US 2017/0016751 A1 Jan. 19, 2017

(30) Foreign Application Priority Data

Jul. 17, 2015 (DE) .......................... 10 2015 111 686

(51) Int. Cl.
*G06F 11/34* (2006.01)
*G01F 1/84* (2006.01)
*G01F 25/00* (2006.01)

(52) U.S. Cl.
CPC ............ *G01F 1/8422* (2013.01); *G01F 1/849* (2013.01); *G01F 1/8431* (2013.01); *G01F 1/8436* (2013.01); *G01F 25/0007* (2013.01)

(58) Field of Classification Search
CPC ........ G01F 1/8436; G01F 1/8422; G01F 1/58; G01F 1/66; G01F 1/8413; G01F 1/845; G01F 1/8495
See application file for complete search history.

(56) References Cited

U.S. PATENT DOCUMENTS 5,469,748 A 11/1995 Kalotay
6,988,026 B2 * 1/2006 Breed .................... G07C 5/008
701/31.4
(Continued)

FOREIGN PATENT DOCUMENTS

DE 102005025354 A1 5/2005
DE 102011100092 A1 4/2011
(Continued)

*Primary Examiner* — Elias Desta
(74) *Attorney, Agent, or Firm* — Borden Ladner Gervais LLP

(57) ABSTRACT

Described and shown is a method for operating a Coriolis mass flowmeter (1) having at least one measuring tube (2), an oscillation exciting device (3) for exciting the measuring tube (2) to an oscillation (4), at least a first oscillation sensor (5) and a second oscillation sensor (6) and at least a first sensor signal path and a second sensor signal path. The object of the invention is to provide a method in which the measuring accuracy is increased compared to the prior art. The object is achieved in that at least one first test signal is generated having at least one first test signal frequency, that the at least first test signal is fed at least into the first sensor signal path and into the second sensor signal path, that the at least first test signal is guided by the first sensor signal path over the first oscillation sensor (5) and by the second sensor signal path over the second oscillation sensor (6), that a test signal propagation time difference of at least the first test signal is determined at least between the first sensor signal path and the second sensor signal path, and that a sensor signal propagation time difference between a first sensor signal and a second sensor signal is compensated with the test signal propagation time difference. Additionally, the invention relates to a corresponding Coriolis mass flowmeter.

19 Claims, 4 Drawing Sheets

(56) References Cited

U.S. PATENT DOCUMENTS 7,555,397 B2 6/2009 Roost et al.
9,335,196 B2 5/2016 Kolahi et al.

FOREIGN PATENT DOCUMENTS

DE 102013021136 B3 12/2014
WO 2006001805 A1 1/2006

* cited by examiner

METHOD FOR OPERATING A CORIOLIS MASS FLOWMETER AND RESPECTIVE CORIOLIS MASS FLOWMETER

CROSS REFERENCE TO RELATED APPLICATIONS

This application claims the benefit of priority of German Application No. 10 2015 111 686.3, filed Jul. 17, 2015, which is hereby incorporated by reference.

FIELD OF THE INVENTION

The invention relates to a method for operating a Coriolis mass flowmeter having at least one measuring tube, an oscillation exciting device for exciting the measuring tube to an oscillation, at least a first oscillation sensor and a second oscillation sensor and at least a first sensor signal path and a second sensor signal path.

Furthermore, the invention relates to a Coriolis mass flowmeter having at least one measuring tube, an oscillation exciting device for exciting the measuring tube to an oscillation, at least a first oscillation sensor and a second oscillation sensor, an evaluation unit and at least a first and a second sensor signal path.

BACKGROUND OF THE INVENTION

The functional principle of the Coriolis mass flowmeter is that the measuring tube having medium flowing through it is excited to an oscillation, wherein the direction of oscillation of the measuring tube and thus also of the medium flowing through the measuring tube has at least one component orthogonal to the direction of flow of the medium in the measuring tube. The orthogonal component of oscillation of the medium flowing in the measuring tube causes a Coriolis inertia in the flowing medium, which works against the orthogonal component of the oscillation. The Coriolis inertia causes the occurrence of a phase difference between the oscillation of the measuring tube at two respective measuring tube points along the longitudinal axis of the measuring tube, which is proportional to the mass flow of the medium through the measuring tube. The Coriolis mass flowmeter measures the phase difference and, from this, determines the mass flow of the medium.

Each oscillation sensor is arranged at a measuring tube point, has a first sensor connection and a second sensor connection and is designed for output of a sensor signal representing the oscillation at the measuring tube point between the first sensor connection and the second sensor connection. The measuring tube points are spaced from one another along the longitudinal axis of the measuring tube. More than one of the oscillation sensors can also be arranged at each measuring tube point, wherein the oscillation sensors arranged at one of the measuring tube points are considered a single oscillation sensor. The sensor signal is an analog, electrical signal, which is output between the first sensor connection and the second sensor connection and wherein the amplitude of the sensor signal represents the amplitude of the oscillation and the phase of the sensor signal represents the phase of the oscillation at the measuring tube point.

The evaluation unit has a digitization unit having at least a first digitization channel and a second digitization channel. Thereby, each of the digitization channels has at least a first analog signal input. The digitization unit digitizes the analog signals applied to the digitization channels at certain points in time. The points in time are usually determined by the evaluation unit. The digitization unit normally has at least an analog-to-digital converter for digitization. An analog-to-digital converter converts the amplitude of an analog, electrical signal applied to one of its signal inputs at a certain point in time into a piece of data corresponding to the amplitude.

Each of the sensor signal paths has an output signal path and an input signal path. The beginning of each of the output signal paths is located in the evaluating unit and the end of each of the output signal paths is connected to the respective first sensor connection by one of the oscillation sensors. The beginning of each of the input signal paths is connected to the respective second sensor connection of one of the oscillation sensors and the end of each of the input signal paths is connected to the respective first analog signal input of one of the digitization channels.

The beginning of each of the sensor signal paths coincides with the beginning of the respective output signal path and the end of each of the sensor signal paths coincides with the end of the respective input signal path. Accordingly, each of the sensor signal paths also includes the signal path between the first sensor connection and the second sensor connection of the respective oscillation sensor.

The sensor signal of the first oscillation sensor propagates in the direction of the first analog signal input of the first digitization channel of the digitization unit from the second sensor connection of the first oscillation sensor over the first input signal path. Accordingly, the sensor signal of the second oscillation sensor propagates in the direction of the first analog signal input of the second digitization channel from the second sensor connection of the second oscillation sensor over the second input signal path.

The evaluation unit is designed for determining a mass flow of a medium flowing through a measuring tube from a phase difference caused by the flow of the medium between at least a sensor signal of the first oscillation sensor and a sensor signal of the second oscillation sensor. The digitization unit digitizes the analog sensor signals so that they are available to the evaluation unit for further processing as digital sensor signals. The evaluation unit usually determines the phase difference from the digital sensor signals. The phase difference between two signals of the same frequency corresponds to a time difference of the occurrence of an arbitrarily determined same amplitude of the two signals. In particular, the amplitude of the signal at which the slope is steepest is suitable for determining the time difference. In the case of bipolar, symmetrical, harmonic signals, this is the zero crossing.

In Coriolis mass flowmeters of a similar type known from the prior art, the problem arises in practice that the sensor signal propagation times differ in the sensor signal paths. The temporal difference between the sensor signal propagation times in each of two of the sensor signal paths is called sensor signal propagation time difference. A sensor signal propagation time difference is not to be differentiated from the time difference corresponding to a phase difference, which is why sensor signal propagation time differences compromise the accuracy of Coriolis mass flowmeters of a similar type. Sensor signal propagation time differences occur, in particular, in sensor signal paths of different lengths. Signal paths of different lengths, for example, result when the evaluation unit determines the phase difference and the evaluation unit and the oscillation sensors are separate units and the spacing between the oscillation sensors and the evaluation unit differ from one another.

SUMMARY OF THE INVENTION

The object of the present invention is thus to provide a method for operating a Coriolis mass flowmeter as well as a Coriolis mass flowmeter, in which the measuring accuracy is increased compared to the prior art.

According to a first teaching, the invention relates to a method for operating a Coriolis mass flowmeter, in which the above derived and described object is achieved. The method according to the invention is initially and essentially characterized by the following method steps: In a first method step, at least one first test signal is generated having at least one first test signal frequency. In a second method step, the at least first test signal is fed at least into the first sensor signal path and into the second sensor signal path. In a third method step, the at least first test signal is guided by the first sensor signal path over the first oscillation sensor and by the second sensor signal path over the second oscillation sensor. In a fourth method step, a test signal propagation time difference of at least the first test signal is determined at least between the first sensor signal path and the second sensor signal path. And, in a fifth method step, a sensor signal propagation time difference between a first sensor signal and a second sensor signal is compensated with the test signal propagation time difference.

First, in the method according to the invention, the test signal is generated having a frequency spectrum, which includes either only the first test signal frequency or, in addition to the first test signal frequency, also at least one further test signal frequency. In one implementation of the method, the test signal is generated with a frequency spectrum, through which the test signal has the temporal progression of a rectangle. The different frequency portions of the test signal are generated with different amplitudes in different designs.

Then, the test signal is fed—preferably simultaneously—into at least the first and the second sensor signal paths, wherein the oscillation sensors are located in the sensor signal paths. Thereafter, it propagates in the sensor signal paths, wherein the test signal propagation times in the sensor signal paths can be different due to differences between the sensor signal paths. The temporal difference between the test signal propagation times in each of the two sensor signal paths is called the test signal propagation time difference.

The method according to the invention is based on the knowledge that there is a correlation between the test signal propagation time difference and the sensor signal propagation time difference, wherein this correlation is described by the transmission function of the sensor signal paths. The knowledge of the correlation, however, is not necessary for compensating the sensor signal propagation time difference. The sensor signal propagation time difference is, for example, compensated or at least reduced in that of two sensor signals each propagating in a sensor signal path, the sensor signal propagating on the sensor signal path having the lesser test signal propagation time of the two sensor signal paths is delayed. The measure for the delay is thereby the test signal propagation time difference of the test signal on both sensor signal paths.

The method according to the invention has the advantage that it improves the measuring accuracy of the Coriolis mass flowmeter. The improved measuring accuracy is achieved in that the phase difference between the sensor signal of the first oscillation sensor and the sensor signal of the second oscillation sensor is compromised, at least to a lesser extent, by the sensor signal propagation time difference between the sensor signal of the first oscillation sensor and the sensor signal of the second oscillation sensor. In particular, the method according to the invention makes it possible to compensate sensor signal propagation time differences occurring after a calibration, as they occur, for example, in the installation of a Coriolis mass flowmeter at the operation site with sensor signal paths of different lengths.

The transmission behavior of signal paths is basically dependent on the frequency spectrum of the signal to be transmitted. The dependency entails the signal propagation time of a first signal that has a first frequency spectrum over a signal path differing from the signal propagation time of a second signal that has a frequency spectrum differing from the first frequency spectrum over the signal path. For this reason, it is provided in an implementation of the method according to the invention that, in compensating the sensor signal propagation time difference, the frequency dependency of the transmission behavior of at least the first sensor signal path is taken into account. The consideration of the dependency of the transmission behavior of a signal path on the frequency spectrum of the test signal to be transmitted accordingly improves the compensation of the sensor signal propagation time difference.

The evaluation of signals is basically simplified when the signals have frequency spectrums differing from one another, since then, the signals can be identified and differentiated from one another using their frequency spectrums. Thus, it is provided in a further implementation of the method according to the invention that at least the first test signal is generated with a frequency spectrum that is free of the frequency of the oscillation. Accordingly, the frequency spectrum of the sensor signal differs from the frequency spectrum of the at least first test signal.

In a further implementation, based on the above-described implementation, it is additionally provided that at least the first test signal is generated with a frequency spectrum that is below the frequency of the oscillation and at least a second test signal is generated with a frequency spectrum that is above the frequency of the oscillation. Each of the frequency spectrums can thereby contain a single frequency or also an arbitrary number of frequencies.

Preferably, it is provided that at least the sensor signal propagation time difference is determined by means of interpolation using at least the test signal propagation time difference of the first test signal and the test signal propagation time difference of the second test signal. Interpolation allows for the sensor signal propagation time difference to be determined more exactly than previously, which improves the compensation of the sensor signal propagation time difference.

Based on above-described implementations, it is provided in a further implementation that the transmission function of the first signal path is determined using at least the test signal propagation time difference of the first test signal and the test signal propagation time difference of the second test signal. The transmission function of a signal path describes the transmission behavior of the signal path, in particular as a function of the frequency. The parameters of a transmission function are, for example, determined from the test signal propagation time difference taking into account the frequency spectrums of the test signals. The sensor signal propagation time difference is determined more exactly than previously due to the determination of the transmission function of at least the first signal path, whereby the compensation of the sensor signal propagation time difference is improved.

According to a second teaching, the invention relates to a Coriolis mass flowmeter, in which the above derived and described object is achieved. The Coriolis mass flowmeter according to the invention is initially and essentially characterized in that the evaluation unit has a test signal generator having a test signal output, a test signal path and a signal connecting device having at least a first signal connecting input and a signal connecting output. The test signal generator is thereby designed to generate at least a first test signal having at least a first test signal frequency. The test signal path is connected to the test signal output and to the first signal connecting input and the signal connecting output is connected at least to the beginning of the first output signal path and the beginning of the second output signal path. The evaluation unit is further designed to determine a test signal propagation time difference of at least the first test signal at least between the first sensor signal path and the second sensor signal path and to compensate a sensor signal propagation time difference between a first sensor signal and a second sensor signal with the test signal propagation time difference.

A test signal generated by the test signal generator propagates from the test signal output over the test signal path to the first signal connecting input of the signal connecting unit. In the signal connecting unit, the test signal propagates from the first signal connecting input to the signal connecting output. The test signal then propagates from the signal connecting output further at least over the first and the second output signal path. The test signal propagates to the first sensor connection of the first oscillation sensor over the first output signal path. The test signal propagates from the first sensor connection to the second sensor connection in the first oscillation sensor. Finally, the test signal propagates from the second sensor connection over the first input signal path to the first analog signal input of the first digitization channel of the digitization unit. The test signal propagates to the first sensor connection of the second oscillation sensor over the second output signal path. The test signal propagates from the first sensor connection to the second sensor connection in the second oscillation sensor. Finally, the test signal propagates from the second sensor connection over the second input signal path to the first analog signal input of the second digitization channel.

The signal paths, which, in particular, are the output signal path, the input signal path, the signal path between each of the first sensor connection and the second sensor connection of one of the oscillation sensors and the test signal path, are usually implemented by electrical conductors. A galvanic separation in an electrical conductor, for example by means of a transformer, does not interrupt the signal path.

In one design, the evaluation unit is designed to determine the test signal propagation time difference with the same functional unit, with which it also determines the phase difference between at least the sensor signal of the first oscillation sensor and the sensor signal of the second oscillation sensor. The phase difference—as already described—also corresponds to a time difference that can be determined by the functional unit of the evaluation unit. Accordingly, it is not necessary to implement a further functional unit in the evaluation unit for determining the test signal propagation time difference.

The implementations of the method according to the invention are also valid for the Coriolis mass flowmeter according to the invention and vice versa.

For improving the compensation, one design of the Coriolis mass flowmeter according to the invention provides that the evaluation unit is designed so that it takes into account the frequency dependency of the transmission behavior of at least the first sensor signal path in compensating the sensor signal propagation time difference.

A further design of the Coriolis mass flowmeter provides that the test signal generator is designed to generate at least the first test signal with a frequency spectrum that is free of the frequency of the oscillation.

In a further design based on the above-described design, it is additionally provided that the test signal generator is designed to generate at least the first test signal with a frequency spectrum that is below the frequency of the oscillation, and is designed to generate at least a second test signal with a frequency spectrum that is above the frequency of the oscillation.

Preferably, the evaluation unit in this design is designed to determine the sensor signal propagation time difference by interpolation using at least the test signal propagation time difference of the first test signal and the test signal propagation time difference of the second test signal.

In a further design based on the above-described design, it is provided that the evaluation unit is additionally designed to determine the transmission function of at least the first signal path using at least the test signal propagation time difference of the first test signal and the test signal propagation time difference of the second test signal.

It is provided in a further design that the test signal generator has a digital-to-analog converter for generating the test signal. The digital-to-analog converter converts digital test signals into analog test signals, wherein the digital test signals represent the amplitude of the analog test signals at certain points in time. The evaluation unit feeds the test signal data preferably to the digital-to-analog converter, for example via a databus. The evaluation unit can either generate the test signal data itself using an algorithm or the test signal data is stored in the evaluation unit.

It is provided in a further design that the evaluation unit has a reference signal generator for generating a reference signal with a reference signal output and a reference signal path, and that the signal connecting unit has a second signal connecting input. The reference signal path is thereby connected to the reference signal output and to the second signal connecting input. The signal connecting unit is designed to form a sum signal by adding the signal applied to the first signal connecting input and the signal applied to the second signal connecting input, and to output the sum signal at the signal connecting output. The signal connecting unit is, for example, an adder. The functionality of the adder can be implemented in a known manner with an operational amplifier and resistors.

The reference signal is preferably a constant signal. The constant reference signal causes the test signal to be shifted by the constant reference signal at the signal connecting output of the signal connecting unit. If the evaluation unit is only to be supplied with one voltage, half of the supply voltage is appropriate for the reference signal. Half of the supply voltage as reference signal allows for signals, i.e. in particular test signals and sensor signals, with the largest amplitudes.

Preferably, the reference signal generator in this design is integrated in the digitization unit and the reference signal is the reference signal of the digitization unit. Digitization units require a reference signal in digitizing signals, which is used as a standard. If the digitization unit has an analog-to-digital converter with an internal voltage reference and a voltage reference output, the voltage reference can be the reference signal generator and the voltage reference output can be the reference signal output.

Based on the above-described design, it is provided in a further design of the Coriolis mass flowmeter according to the invention that at least one of the digitization channels has a second analog signal input, that the second analog signal input is connected to the reference signal path and that the digitization unit is designed for subtracting the signal applied at the second analog signal input from the signal applied at the first analog signal input.

Normally, the accuracy of a digitization unit is at the highest when the signals to be digitized have an amplitude that is as close as possible to the maximum allowable amplitude of the digitization unit. Thus, the subtraction of the reference signal from the signal, which can be a test signal and/or a sensor signal, applied at the first analog signal input has the effect that a reduction of the resolution of the digitization unit is avoided.

In a design alternative to one of the above-described designs, it is provided that at least one of the digitization channels has a second analog signal input and the second analog signal input is connected to the reference signal path. It is further provided that the evaluation unit has at least one signal processing unit having a first signal processing input, a second signal processing input, a first signal processing output and a second signal processing output. Thereby, the first signal processing input and the first signal processing output are arranged in the input signal path of the digitization channel. The second signal processing input and the second signal processing output are arranged in the branch of the reference signal path that is connected to the second analog signal input. The signal processing unit is thereby designed to form a difference signal by subtracting the signal applied at the second signal processing input from the signal applied at the first signal processing input, to amplify the difference signal and to output the difference signal at the first signal processing output. The signal processing unit is further designed to amplify the signal applied at the second signal processing input and to output it at the second signal output.

The arrangement of the first signal processing input and the first signal processing output in the input signal path of the digitization channel and the arrangement of the second signal processing input and the second signal processing output in the branch of the reference path does not separate the input signal path and the output signal path.

The subtraction of the signal applied at the second signal processing input from the signal applied at the first signal processing input is, for example, implemented using a subtractor. The functionality of the subtractor is implemented, for example, in a known manner using at least one operational amplifier and resistor. The amplification of the signal applied at the second signal processing input is implemented by an amplifier. The functionality of the amplifier is, for example, implemented in a known manner using an operational amplifier and resistors.

Usually—as already indicated—the accuracy of a digitization unit is at the highest when the signal to be digitized has a signal strength that is as close as possible to the maximum allowable signal strength of the digitization unit. Thus, it is advantageous when the amplification of the difference signal and the amplification of the signal applied at the second signal processing input are adjusted so that the signal strength is as close as possible to the maximum allowable signal strength of the digitization unit.

In a further implementation of the Coriolis mass flowmeter according to the invention, it is provided that an output signal test path is present and the digitization unit has a third digitization channel. The output signal test path is thereby connected to the signal connecting output and to the first analog signal input of the third digitization channel. The evaluation unit is designed to evaluate the signal applied at the third digitization channel. By evaluating the signal applied at the third digitization channel, the evaluation unit is designed, for example, to compensate the influences before the signal connecting output in the direction of flow of the signal on the signals transmitted at least over the first signal path and the second signal path, said signals being measured at the remaining digitization channels. The signal applied at the third digitization channel is used, for example, for evaluating the test signals generated by the test signal generator.

In a further design of the Coriolis mass flowmeter according to the invention, it is provided that the evaluation unit has a multiplexer having a first, a second and a third multiplexer input and having at least a first and a second multiplexer output. Thereby, respectively one each of the two first multiplexer inputs and one of the multiplexer outputs is connected to one of the input signal paths and each of the input signal paths is separated between the respective multiplexer input and the respective multiplexer output. The third multiplexer input is connected to the test signal path. The multiplexer is designed to connect each of the multiplexer inputs to at least one of the multiplexer outputs. The multiplexer is preferably controlled by the evaluation unit.

Thus, the multiplexer is designed to connect different signal paths to one another. For example, the multiplexer creates a signal path between the second sensor connection of the first oscillation sensor and the first analog signal connection of the first digitization channel and a signal path between the second sensor connection of the second oscillation sensor and the first analog signal connection of the second digitization channel. Or, the multiplexer creates a signal path between the second sensor connection of the first oscillation sensor and the first analog signal connection of the second digitization channel and a signal path between the second sensor connection of the second oscillation sensor and the first analog signal connection of the first digitization channel. Or, the multiplexer creates a signal path between the test signal output and the first analog signal connection of the first digitization channel and/or a signal path between the test signal output and the first analog signal connection of the second digitization channel.

It is provided in a further design that at least one explosion protection element is arranged in at least one of the signal paths arranged in the evaluation unit. In particular, the signal paths include the test signal path, the input signal path, the output signal path and—if present—the reference signal path and the output signal test path. The explosion protection element in at least one of the signal paths has the effect that the evaluation unit does not represent an effective source of ignition in operation in an ignitable atmosphere.

It is provided in a further design that at least the first oscillation sensor is an inductive sensor having a coil and a magnet and that a relative movement between the coil and the magnet generates the first sensor signal. A relative movement between the coil and the magnet occurs, for example, by arranging the magnet at the first measuring tube point and arranging the coil in the magnetic field of the magnet on a resting object in respect to the oscillation of the measuring tube.

It is provided in a further design that at least the input impedance of the first analog signal input is chosen so that the test signals that can be generated by the test signal generator cause an electric current through the first sensor connection, the electric current bringing about a force acting on the first measuring tube point that influences the oscillation only to the extent that the error in determining the mass flow of the medium flowing through the measuring tube lies in a given error tolerance range. If inductive sensors are used as oscillation sensors, the current flowing due to one of the test signals brings about a force acting on the measuring tube. The strength of the force acting on the measuring tube thereby correlates to the test signal and can cause an impairment of the oscillation of the measuring tube brought about by the oscillation exciting device, whereby the measuring accuracy of the Coriolis mass flowmeter is compromised. The impairment that is still acceptable is dependent on the respective application of the Coriolis mass flowmeter.

In detail, there is a plurality of possibilities for designing and further developing the method according to the invention and the Coriolis mass flowmeter according to the invention. Reference is made both to the patent claims subordinate to patent claims 1 and 7 and to the following description of embodiments in conjunction with the drawing. The drawing shows:

DETAILED DESCRIPTION

Figure 1:
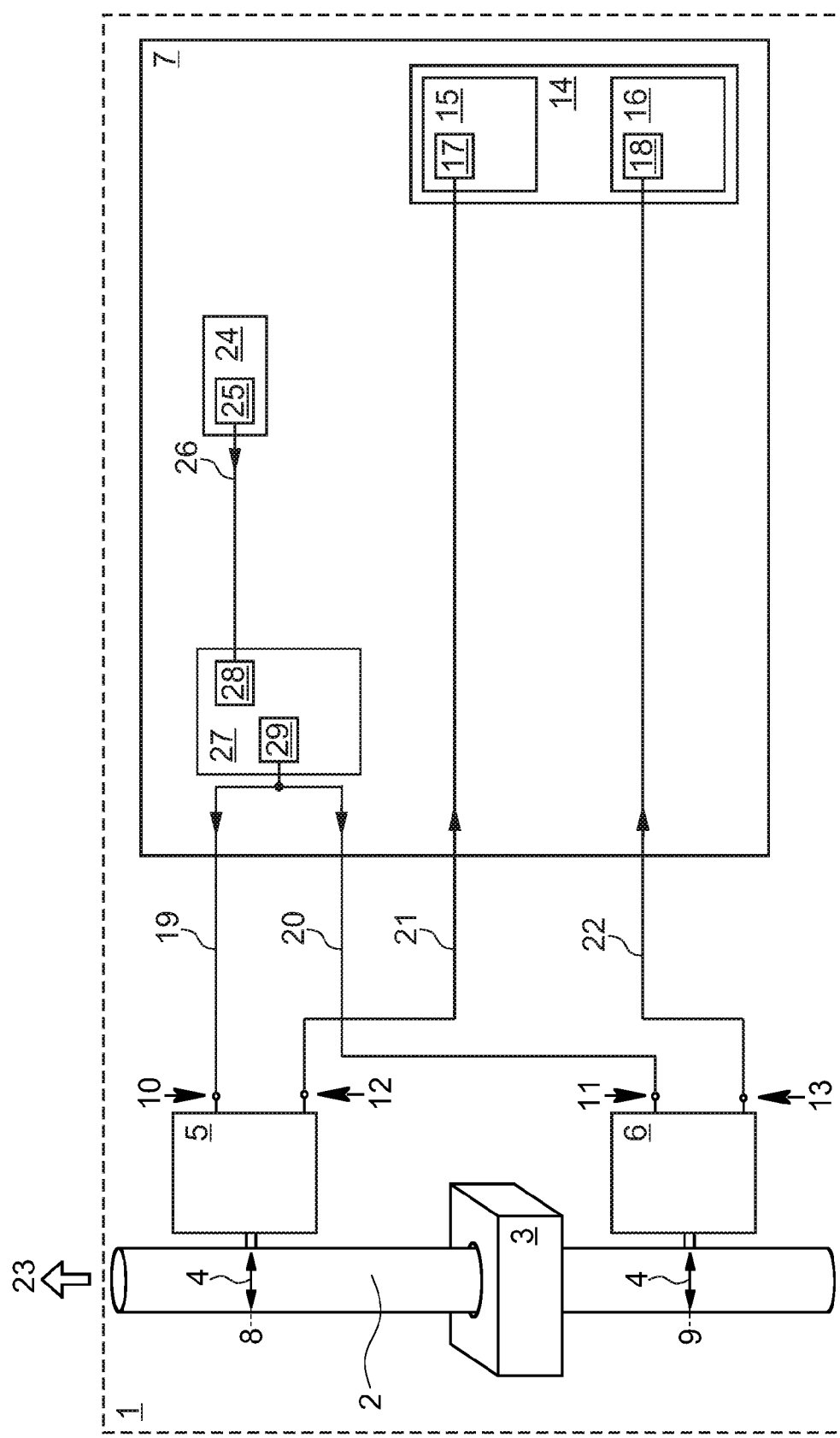
FIG. 1 a first embodiment of a Coriolis mass flowmeter according to the invention, FIG. 2 a flow chart of an embodiment of the method according to the invention, FIG. 3 a second embodiment of the Coriolis mass flowmeter according to the invention, based on the first embodiment, and FIG. 4 a third embodiment of the Coriolis mass flowmeter according to the invention, based on the second embodiment.

FIG. 1 schematically shows a first embodiment of the Coriolis mass flowmeter 1 according to the invention. The Coriolis mass flowmeter 1 has a measuring tube 2, an oscillation exciting device 3 for exciting the measuring tube 2 to an oscillation 4, a first oscillation sensor 5, a second oscillation sensor 6, an evaluation unit 7, a first sensor signal path and a second sensor signal path.

The first oscillation sensor 5 is arranged at a first measuring tube point 8 and the second oscillation sensor 6 is arranged at a second measuring tube point 9. The first oscillation sensor 5 has a first sensor connection 10 and the second oscillation sensor 6 also has a first sensor connection 11. The first oscillation sensor 5 also has a second sensor connection 12 and the second oscillation sensor 6 also has a second sensor connection 13. The first oscillation sensor 5 is designed for output of an analog sensor signal representing the oscillation 4 at the first measuring tube point 8 between its first sensor connection 10 and its second sensor connection 12. Accordingly, the second oscillation sensor 6 is designed for output of an analog sensor signal representing the oscillation 4 at the second measuring tube point 9 between its first sensor connection 11 and second sensor connection 13.

The evaluation unit 7 has a digitization unit 14 having a first digitization channel 15 and a second digitization channel 16. The first digitization channel 15 has a first analog signal input 17 and the second digitization channel 16 also has a first analog signal input 18.

The first sensor signal path comprises a first output signal path 19, wherein the beginning is located in the evaluation unit 7 and the end is connected to the first sensor connection 10 of the first oscillation sensor 5. Accordingly, the second sensor signal path comprises a second output signal path 20, wherein the beginning is also located in the evaluation unit 7 and the end is connected to the first sensor connection 11 of the second oscillation sensor 6.

The first sensor signal path further comprises a first input signal path 21. The beginning of the first input signal path 21 is connected to the second sensor connection 12 of the first oscillation sensor 5 and the end of the first input signal path 21 is connected to the first analog signal input 17 of the first digitization channel 15. The beginning of the first sensor signal path coincides with the beginning of the first output signal path 19 and the end of the first sensor signal path coincides with the end of the first input signal path 21.

Accordingly, the second sensor signal path comprises a second input signal path 22. The beginning of the second input signal path 22 is connected to the first analog signal input 18 of the second digitization channel 16. The beginning of the second sensor signal path coincides with the beginning of the second output signal path 20 and the end of the second sensor signal path coincides with the end of the second input signal path 22.

The evaluation unit 7 is designed to determine the mass flow of a medium 23 flowing through the measuring tube 2 using the phase difference between the sensor signal of the first oscillation sensor 5 and the sensor signal of the second oscillation sensor 6 caused due to the medium 23.

Furthermore, the evaluation unit 7 has a test signal generator 24 having a test signal output 25, a test signal path 26 and a signal connecting unit 27 having a first signal connecting input 28 and a signal connecting output 29. The test signal generator 24 is designed to generate a first test signal having a first test signal frequency. The test signal path 26 is connected to the test signal output 25 and to the first signal connecting input 28 of the signal connecting unit 27. The signal connecting output 29 is connected both to the beginning of the first output signal path 19 as well as to the beginning of the second output signal path 20.

The evaluation unit 7 is designed to determine the test signal propagation time difference of the first test signal between the first sensor signal path and the second sensor signal path and to compensate the sensor signal propagation time difference between the sensor signal of the first oscillation sensor 5 and the sensor signal of the second oscillation sensor 6 using the test signal propagation time difference. For this, the evaluation unit 7 performs the following implementation of the method according to the invention.

Figure 2:
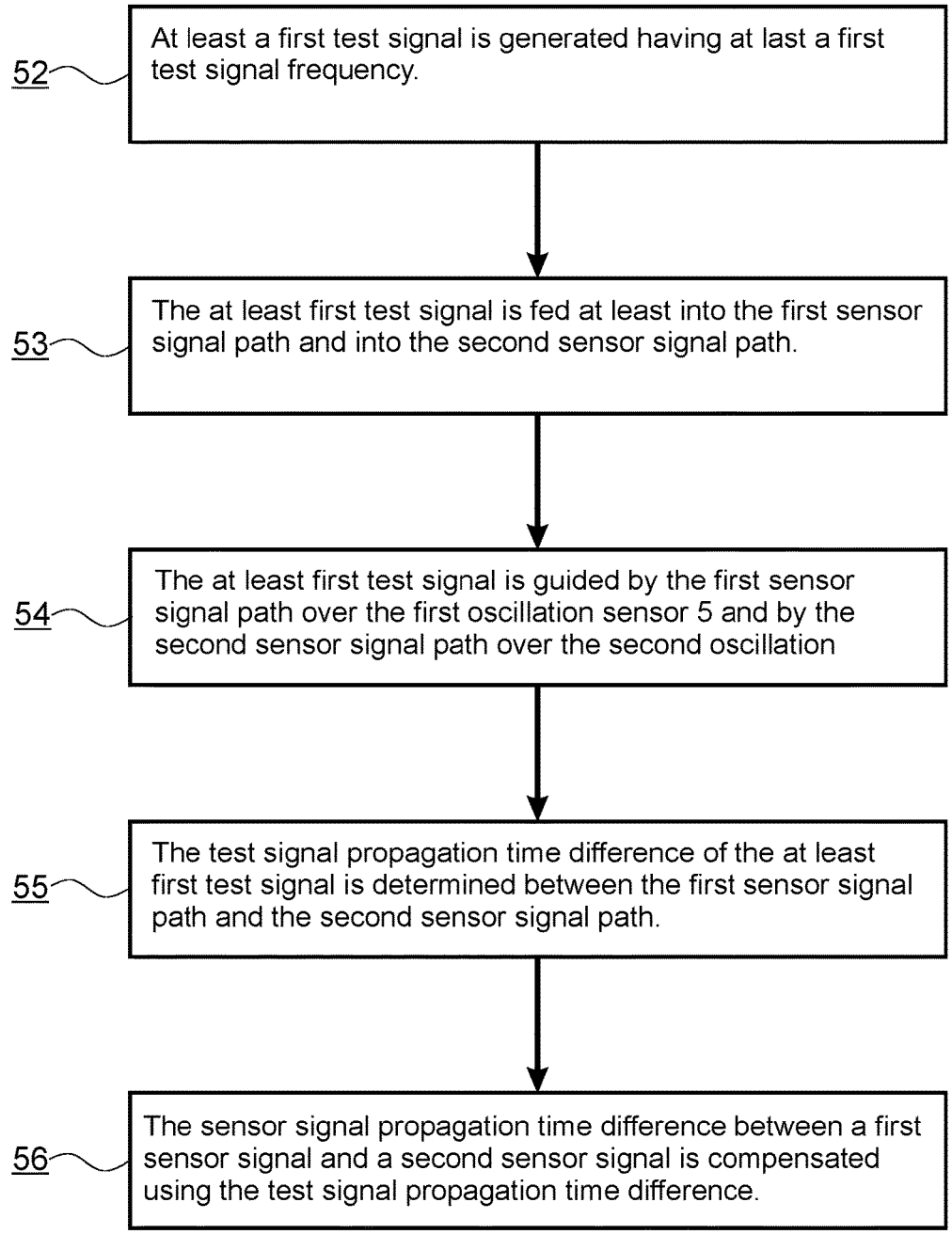

FIG. 2 shows a flow chart of the embodiment of the method according to the invention. The method comprises five method steps: In a first method step 52, at least a first test signal is generated having at last a first test signal frequency. In a second method step 53, the at least first test signal is fed at least into the first sensor signal path and into the second sensor signal path. In a third method step 54, the at least first test signal is guided by the first sensor signal path over the first oscillation sensor 5 and by the second sensor signal path over the second oscillation sensor 6. In a fourth method step 55, the test signal propagation time difference of the at least first test signal is determined between the first sensor signal path and the second sensor signal path. And, in a fifth method step 56, the sensor signal propagation time difference between a first sensor signal and a second sensor signal is compensated using the test signal propagation time difference.

The sensor signal propagation time difference is compensated in that of two sensor signals each propagating in a sensor signal path, the sensor signal propagating on the sensor signal path having the lesser test signal propagation time of the two sensor signal paths is delayed. The measure for the delay is thereby the test signal propagation time difference of the test signal on both sensor signal paths.

Figure 3:
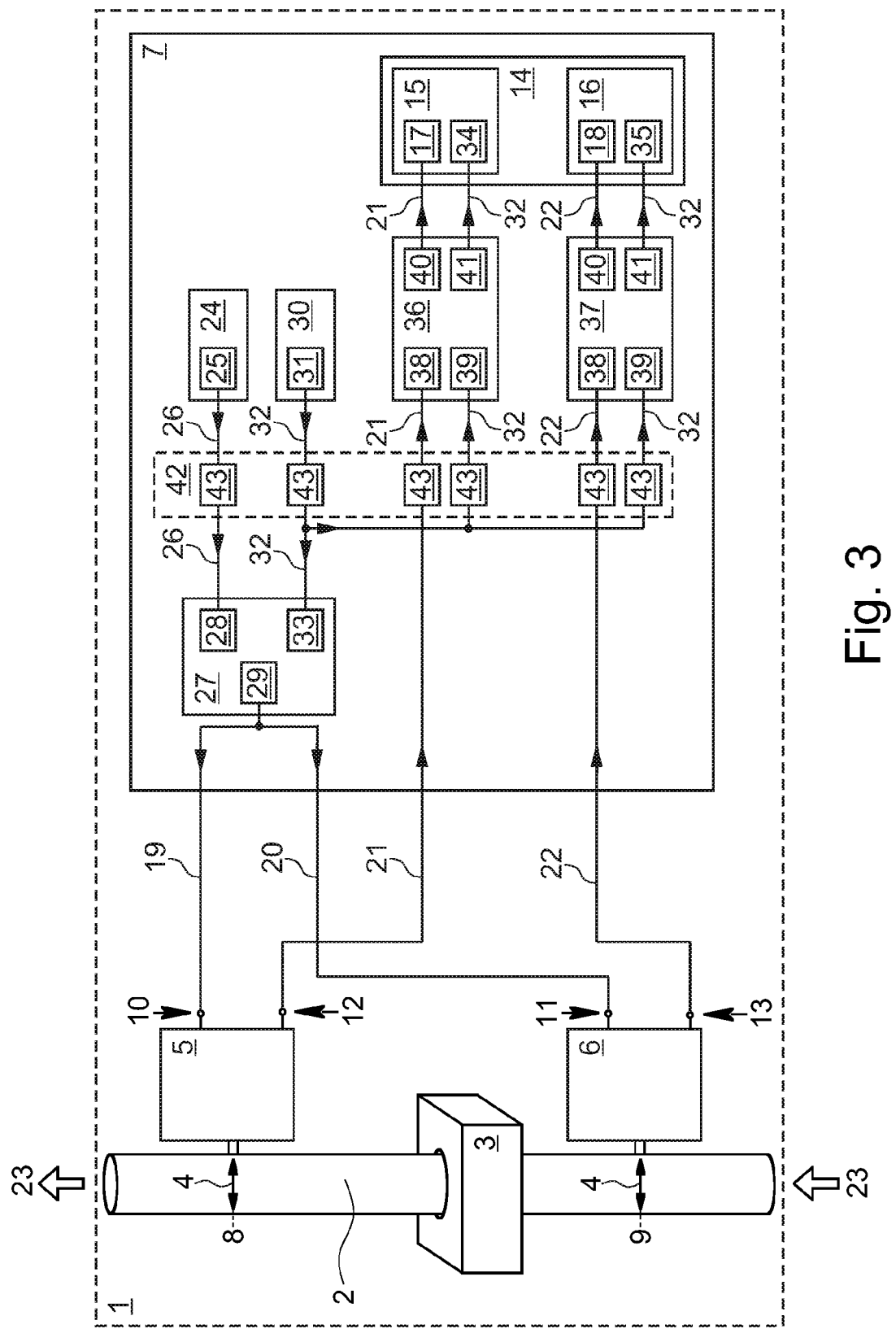

FIG. 3 shows a schematic representation of a second embodiment of the Coriolis mass flowmeter 1 according to the invention. The second embodiment is based on the first embodiment and is, thus, described essentially only to the extent in which it differs from the first embodiment in order to avoid repetition as far as possible.

The evaluation unit 7 of the second embodiment of the Coriolis mass flowmeter 1 according to the invention has, in addition to the evaluation unit 7 known from the first embodiment, a reference signal generator 30 for generating a reference signal and having a reference signal output 31 and a reference signal path 32. The evaluation unit 7 is supplied with a single supply voltage and the reference signal generator 30 generates a constant reference signal in the amount of half of the supply voltage.

In addition to the connecting unit 27 known from the first embodiment, the connecting unit 27 has a second signal connecting input 33. The reference signal path 32 is connected to the reference signal output 31 of the reference signal generator 30 and to the second signal connecting input 33 of the signal connecting unit 27. The signal connecting unit 27 is designed to form a sum signal by adding the signal applied at the first signal connecting input 28 and the signal applied at the second signal connecting input 33 and to output the sum signal at the signal connecting outlet 29. Consequently, test signals are shifted at the signal connecting output 29 by the half of the supply voltage. This allows for the largest amplitudes in the test signals at the given supply voltage.

Furthermore, the second embodiment differs from the first embodiment in that the first digitization channel 15 has a second analog signal input 34 that is connected to the reference signal path 32 and the second digitization channel 16 has a second analog signal input 35 that is connected to the reference signal path 32.

Moreover, the evaluation unit 7 has a first signal processing unit 36 and a second signal processing unit 37. Each of the signal processing units 36, 37 has a first signal processing input 38, a second signal processing input 39, a first signal processing output 40 and a second signal processing output 41.

The first signal processing input 38 and the first signal processing output 40 of the first signal processing unit 36 are arranged in the first input signal path 21. The second signal processing input 39 and the second signal processing output 41 of the first signal processing unit 36 are arranged in the branch of the reference path 32 that is connected to the second analog signal input 34 of the first digitization channel 15. Accordingly, the first signal processing input 38 and the first signal processing output 40 of the second signal processing unit 37 are arranged in the second input signal path 22. And also accordingly, the second signal processing input 39 and the second signal processing output 41 are arranged in the branch of the reference path 32 that is connected to the second analog signal input 35 of the second digitization channel 16.

Each of the signal processing units 36, 37 is designed to form a difference signal by subtracting the signal applied at the second signal processing input 39 from the signal applied at the first signal processing input 38, to amplify the difference signal and to output the difference signal at the first signal processing output 40. Furthermore, the signal processing units 36, 37 are designed to amplify the signal applied at the second signal processing input 39 and to output the amplified signal at the second signal processing output 41. Consequently, on the one hand, a sensor signal and/or test signal adjusted by half of the supply voltage is applied at the first respective signal processing output 40. On the other hand, half of the supply voltage is applied at the respective second signal processing output 41. This ensures that the allowable input voltage range of the first analog signal inputs 17, 18 and the second analog signal inputs 34, 35 are optimally used and a reduction of the resolution of the digitization unit 14 is avoided.

The second embodiment of the Coriolis mass flowmeter 1 according to the invention does not represent an effective source of ignition in operation in an ignitable atmosphere. This is ensured by an explosion protection device 42 provided in the control device 7. The explosion protection device 42 has an explosion protection element 43 in each of the test signal path 26, the reference signal path 32, the first input signal path 21, the branch of the reference signal path 32 that is connected to the second analog signal input 34 of the first digitization channel 15, the second input signal path 22, and the branch of the reference signal path 32 that is connected to the second analog signal input 35 of the second digitization channel. The explosion protection elements 43 are designed according to the respective requirements of the explosion protection class. For example, the explosion protection elements limit currents and voltages, so that minimum ignition energy and ignition temperature of an explosive atmosphere are not reached. Normally, the requirements of the explosion protection classes are given by standards. The individual explosion protection elements 43 can also correspond to different explosion protection classes. As an alternative to the explosion protection device 42, the evaluation unit can be designed to be intrinsically safe.

Figure 4:
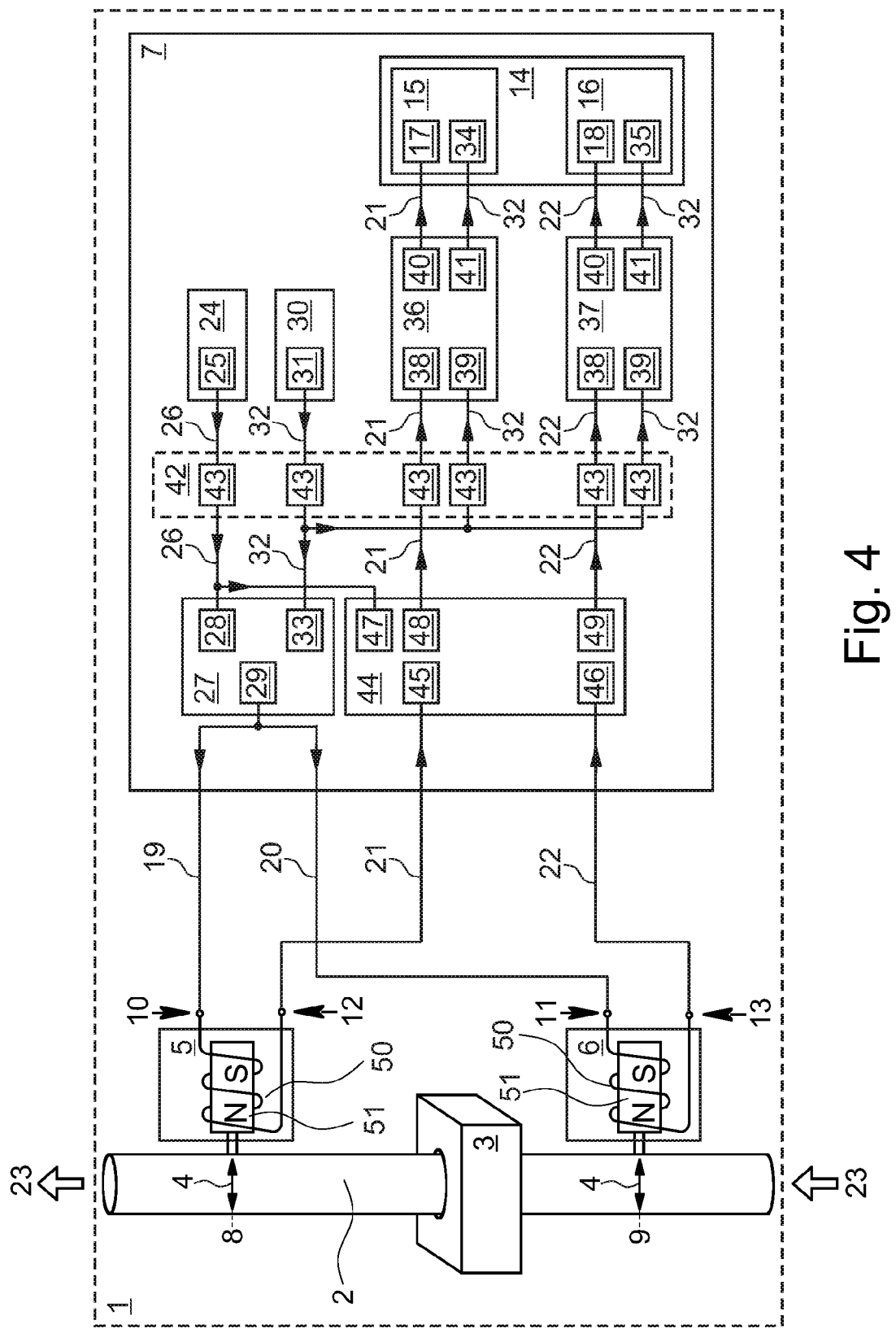

FIG. 4 shows a schematic representation of a third embodiment of the Coriolis mass flowmeter 1 according to the invention. The third embodiment is based on the second embodiment and is, thus, only described to the extent in which it differs from the second embodiment to avoid repetition as far as possible.

The evaluation unit 7 of the third embodiment of the Coriolis mass flowmeter 1 according to the invention has, in addition to the evaluation unit 7 known from the second embodiment, a multiplexer 44 having a first multiplexer input 45, a second multiplexer input 46 and a third multiplexer input 47 and having a first multiplexer output 48 and a second multiplexer output 49.

The first multiplexer input 45 and the first multiplexer output 48 are connected to the first input signal path 21 and the first input signal path 21 is separated by the multiplexer 44. Accordingly, the second multiplexer input 46 and the second multiplexer output 49 are connected to the second input signal path 22 and the second input signal path 22 is also separated by the multiplexer 44. The third multiplexer input 47 is connected to the test signal path 26 and the multiplexer 44 is designed to connect the multiplexer inputs 45, 46, 47 to at least one of the multiplexer outputs 48, 49.

The multiplexer 44 interchanges, for example, the first input signal path 21 with the second input signal path 22, so that signal propagation time differences in the first input signal path 21 and the second input signal path 22 between the multiplexer 44 and the digitization unit 14 are recognized. Or, the multiplexer 44 applies the reference signal to the first input signal path 21 and the second input signal path 22 for diagnostic purposes.

In this embodiment, the oscillation sensors 5, 6 are inductive sensors. Each of the inductive sensors has a coil 50 and a magnet 51. The magnet 51 of the first oscillation sensor 5 is arranged at the first measuring tube point 8 on the measuring tube 2 so that the oscillation 4 of the measuring tube 2 at the measuring tube point 8 is transferred to the magnet 51. Accordingly, the magnet 51 of the second oscillation sensor 6 is arranged at the second measuring tube point 9 on the measuring tube 2, so that the oscillation 4 of the measuring tube 2 at the measuring tube point 9 is transferred to the magnet 51. The coils 50 are arranged stationary in respect to the oscillation 4 of the measuring tube 2, so that the magnets 51 move relative to the coils 50 due to the oscillation 4. The relative movement between the coils 50 and the magnets 51 generates the sensor signals.

REFERENCE NUMBERS

1 Coriolis mass flowmeter
2 Measuring tube
3 Oscillation exciting device
4 Oscillation
5 First oscillation sensor
6 Second oscillation sensor
7 Evaluation unit
8 First measuring tube point
9 Second measuring tube point
10 First sensor connection of first oscillation sensor
11 First sensor connection of second oscillation sensor
12 Second sensor connection of first oscillation sensor
13 Second sensor connection of second oscillation sensor
14 Digitization unit
15 First digitization channel
16 Second digitization channel
17 First analog signal input of first digitization channel
18 First analog signal input of second digitization channel
19 First output signal path
20 Second output signal path
21 First input signal path
22 Second input signal path
23 Medium
24 Test signal generator
25 Test signal output
26 Test signal path
27 Signal connecting unit
28 First signal connecting input
29 Signal connecting output
30 Reference signal generator
31 Reference signal output
32 Reference signal path
33 Second signal connecting input
34 Second analog signal input of the first digitization channel
35 Second analog signal input of the second digitization channel
36 First signal processing unit
37 Second signal processing unit
38 First signal processing input
39 Second signal processing input
40 First signal processing output
41 Second signal processing output
42 Explosion protection device
43 Explosion protection element
44 Multiplexer
45 First multiplexer input
46 Second multiplexer input
47 Third multiplexer input
48 First multiplexer output
49 Second multiplexer output
50 Coil
51 Magnet
52 First method step
53 Second method step
54 Third method step
55 Fourth method step
56 Fifth method step

What is claimed is:

1. Method for operating a Coriolis mass flowmeter having at least one measuring tube, an oscillation exciting device for exciting the measuring tube to an oscillation, at least a first oscillation sensor and a second oscillation sensor and at least a first sensor signal path and a second sensor signal path, wherein at least one first test signal is generated having at least one first test signal frequency, wherein the at least first test signal is fed at least into the first sensor signal path and into the second sensor signal path, wherein the at least first test signal is guided by the first sensor signal path over the first oscillation sensor and by the second sensor signal path over the second oscillation sensor, wherein a test signal propagation time difference of at least the first test signal is determined at least between the first sensor signal path and the second sensor signal path, wherein a sensor signal propagation time difference between a first sensor signal and a second sensor signal is compensated with the test signal propagation time difference, wherein at least the first test signal and a second test signal are generated having a frequency spectrum that is free of the frequency of the oscillation and wherein at least the first test signal is generated having a frequency spectrum that is below the frequency of the oscillation and at least the second test signal is generated having a frequency spectrum that is above the frequency of the oscillation.

2. Method according to claim 1, wherein the frequency dependency of the transmission behavior of at least the first sensor signal path is taken into account during compensation of the sensor signal propagation time difference.

3. Method according to claim 1, wherein the sensor signal propagation time difference is determined by interpolation using at least the test signal propagation time difference of the first test signal and the test signal propagation time difference of the second test signal.

4. Method according to claim 1, wherein the transmission function of the first signal path is determined using at least the test signal propagation time difference of the first signal and the test signal propagation time difference of the second test signal.

5. Coriolis mass flow meter having at least one measuring tube, an oscillation exciting device for exciting the measuring tube to an oscillation, at least a first oscillation sensor and a second oscillation sensor, an evaluation unit and at least a first sensor signal path and a second sensor signal path, wherein each of the oscillation sensors is arranged at a measuring tube point, has a first sensor connection and a second sensor connection and is designed for output of a sensor signal representing the oscillation at the measuring tube point between the first sensor connection and the second sensor connection, wherein the evaluation unit has a digitization unit having at least a first digitization channel and a second digitization channel, wherein each of the digitization channels has at least a first analog signal input, wherein each of the sensor signal paths has an output signal path and an input signal path, wherein the beginning of each of the output signal paths is located in the evaluation unit and the end of each of the output signal paths is connected to a respective first sensor connection of one of the oscillation sensors and the beginning of each of the input signal paths is each connected to a respective second sensor connection of one of the oscillation sensors and the end of each of the input signal paths is connected to a respective first analog signal input of one of the digitization channels, wherein the beginning of each of signal sensor paths coincides with the beginning of the respective output signal path and the end of each of the sensor signal paths coincides with the end of the respective input signal path, and wherein the evaluation unit is designed for determining a mass flow of a medium flowing through the measuring tube using the phase difference caused by the flow of the medium between at least the first sensor signal and the second sensor signal, wherein the evaluation unit has a test signal generator having a test signal output, a test signal path and a signal connecting device having at least a first signal connecting input and a signal connecting output, wherein the test signal generator is designed to generate at least a first test signal having at least a first test signal frequency, wherein the test signal path is connected to the test signal output and to the first signal connecting input, wherein the signal connecting output is connected at least to the beginning of the first output signal path and the beginning of the second output signal path, wherein the evaluation unit is designed to determine a test signal propagation time difference of at least the first test signal at least between the first sensor signal path and the second sensor signal path and to compensate a sensor signal propagation time difference between a first sensor signal and a second sensor signal with the test signal propagation time difference, wherein an output test signal path is provided, wherein the digitization unit has a third digitization channel, wherein the output signal test path is connected to the signal connecting output and to the first analog signal input of the third digitization channel, and wherein the evaluation unit is designed to evaluate the signal applied at the third digitization channel.

6. Coriolis mass flowmeter according to claim 5, wherein the evaluation unit is designed to take into account the frequency dependency of the transmission behavior of at least the first sensor signal path in compensating the sensor signal propagation time difference.

7. Coriolis mass flowmeter according to claim 5, wherein the test signal generator is designed to generate at least the first test signal having a frequency spectrum that is free of the frequency of the oscillation.

8. Coriolis mass flowmeter according to claim 7, wherein the test signal generator is designed to generate at least a first test signal with a frequency spectrum that is below the frequency of the oscillation and is designed to generate at least a second test signal with a frequency spectrum that is above the frequency of the oscillation.

9. Coriolis mass flowmeter according to claim 8, wherein the evaluation unit is designed to determine the sensor signal propagation time difference by interpolation using at least the test signal propagation time difference of the first test signal and the test signal propagation time difference of the second test signal.

10. Coriolis mass flowmeter according to claim 8, wherein the evaluation unit is designed to determine the transmission function of at least the first signal path using at least the test signal propagation time difference of the first test signal and the test signal propagation time difference of the second test signal.

11. Coriolis mass flowmeter according to claim 5, wherein the test signal generator has a digital-to-analog converter for generating the test signal.

12. Coriolis mass flowmeter according to claim 5, wherein the evaluation unit has a reference signal generator for generating a reference signal having a reference signal output and a reference signal path and the signal connecting unit has a second signal connecting input, wherein the reference signal path is connected to the reference signal output and to the second signal connecting input and wherein the signal connecting unit is designed to form a sum signal by adding the signal applied at the first signal connecting input and the signal applied at the second signal connecting input and to issue the sum signal at the signal connecting output.

13. Coriolis mass flowmeter according to claim 12, wherein the reference signal generator is integrated in the digitization unit and the reference signal is a reference signal of the digitization unit.

14. Coriolis mass flowmeter according to claim 12, wherein at least one of the digitization channels has a second analog signal input, that the second analog signal input is connected to the reference signal path and that the digitization unit is designed to subtract the signal applied at the second analog signal input from the signal applied at the first analog signal input.

15. Coriolis mass flowmeter according to claim 12, wherein at least one of the digitization channels has a second analog signal input, that the second analog signal input is connected to the reference signal path, wherein the evaluation unit has at least one signal processing unit having a first signal processing input, a second signal processing input, a first signal processing output and a second signal processing output, wherein the first signal processing input and the first signal processing output are arranged in the input signal path of the digitization channel, wherein the second signal processing input and the second signal processing output are arranged in a branch of the reference signal path that is connected to the second analog signal input of the digitization channel, wherein the signal processing unit is designed to form a difference signal by subtracting the signal applied at the second signal processing input from the signal applied at the first signal processing input, to amplify the difference signal and to output the difference signal at the first signal processing output and wherein the signal processing unit is designed to amplify the signal applied at the second signal processing input and to output it at the second signal processing output.

16. Coriolis mass flowmeter according to claim 5, wherein the evaluation unit has a multiplexer having at least a first multiplexer input, a second multiplexer input and a third multiplexer input and having at least a first multiplexer output and a second multiplexer output, wherein, in each case, one of the two first multiplexer inputs and one of the multiplexer outputs is connected to one of the input signal paths and each of the input signal paths is separated by the multiplexer between the respective multiplexer input and the respective multiplexer output, wherein the third multiplexer input is connected to the test signal path and that the multiplexer is designed to connect each of the multiplexer inputs to at least one of the multiplexer outputs.

17. Coriolis mass flowmeter according to claim 5, wherein at least one explosion protection element is arranged in at least one of the signal paths arranged in the evaluation unit.

18. Coriolis mass flowmeter according to claim 5, wherein at least the first oscillation sensor is an inductive sensor with a coil and a magnet and that a relative movement between the coil and the magnet generates the first sensor signal.

19. Coriolis mass flowmeter according to claim 5, wherein at least the input impedance of the first analog signal input is chosen so that the test signals that can be generated by the test signal generator cause a current flow through the first connection that brings about a force acting on the first measuring tube point, which influences the oscillation only to such an extent that the error in the determination of mass flow of the medium flowing through the measuring tube lies in a given error tolerance range.

* * * * *